Sept. 28, 1926. 1,601,434
C. G. GARRARD
MEANS FOR THE TRANSMISSION OF POWER SPECIALLY ADAPTED FOR MARINE PURPOSES
Filed April 22, 1924 3 Sheets-Sheet 1
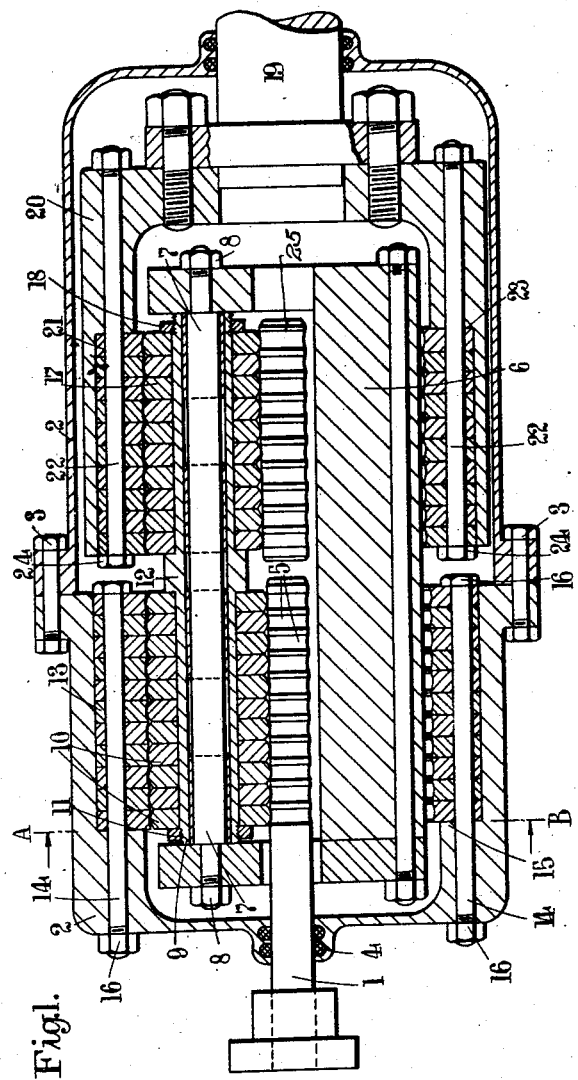

Sept. 28, 1926.
C. G. GARRARD
1,601,434
MEANS FOR THE TRANSMISSION OF POWER SPECIALLY ADAPTED FOR MARINE PURPOSES
Filed April 22, 1924     3 Sheets-Sheet 2
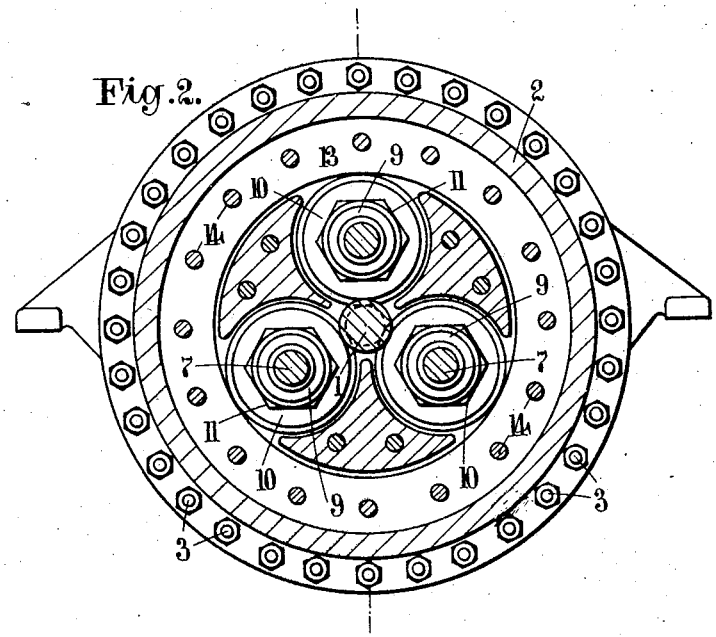
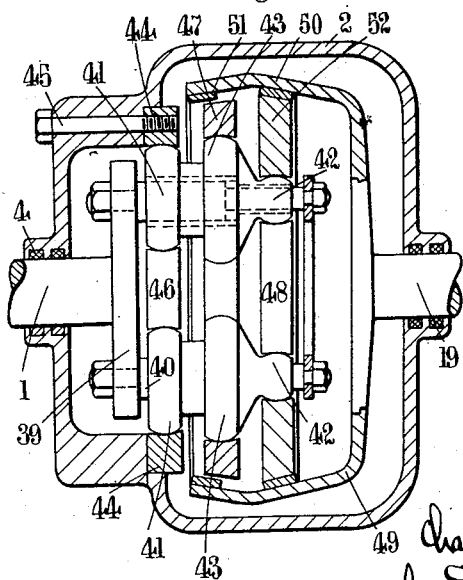
INVENTOR
Charles George Garrard
by Darby & Darby
his Attorneys

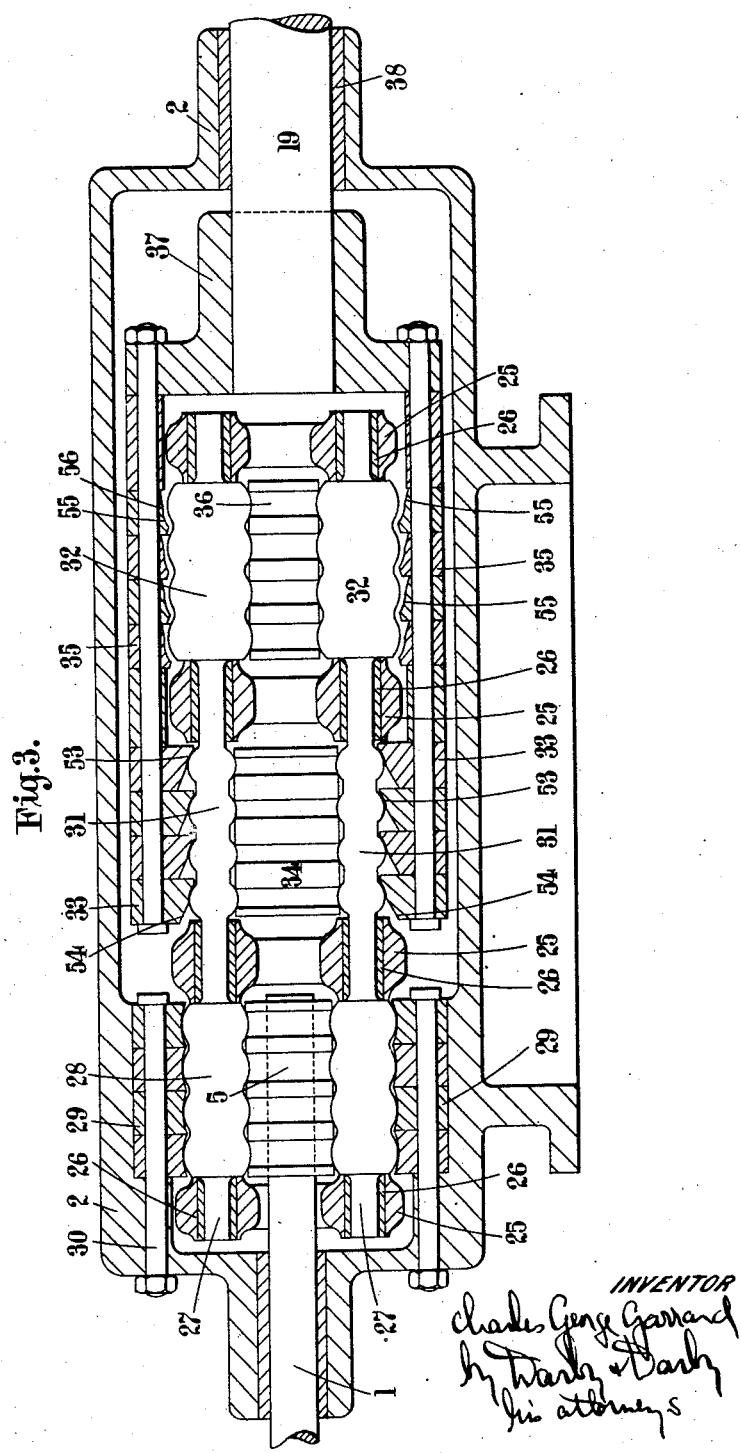

Patented Sept. 28, 1926.

1,601,434

UNITED STATES PATENT OFFICE.

CHARLES GEORGE GARRARD, OF NORTH FINCHLEY, ENGLAND.

MEANS FOR THE TRANSMISSION OF POWER SPECIALLY ADAPTED FOR MARINE PURPOSES.

Application filed April 22, 1924, Serial No. 708,147, and in Great Britain April 30, 1923.

This invention relates to power transmission means more particularly adapted for marine purposes.

In a gear previously invented by me the power is transmitted by a plurality of curved rollers, mounted in a cage to which the driven shaft is secured and engaging with and rotating between and around inner and outer races with curved faces. The necessary binding pressure was provided by a longitudinal pressure applied to some or all of the rollers and/or races, and the parts were so shaped and the whole was so arranged that when the binding pressure necessary for power transmission had been applied to the parts, the angles made by the lines representing the normals to the surfaces in contact at the centres of the contact areas with a plane at right angles to the main axis of the gear, were as small as possible consistent with a contact area sufficient for power transmission, and in no case exceeded 10°. In this way the necessary longitudinal pressure was so resolved as to give a relatively high component of radial pressure with a correspondingly small radial movement, due to compression of the contact surfaces. Curved rollers and races the contact areas of which conform to these directions as to angularity are hereinafter referred to as "rollers and races of the type described", and such a gear is described in my specification No. 657,552 filed Aug. 15, 1923.

Now according to the present invention, I provide a power transmission gear, specially adapted for marine purposes in which the power is transmitted by means of rollers and races of the type described. In the transmission of power from a marine turbine to a propeller shaft, for which purpose the present invention is particularly intended, it is always necessary to effect a considerable reduction in gear between the turbine and the propeller shafts, and the provision, disposal within the vessel, and maintenance of the necessary gearing devices has been one of the difficulties attending the use of marine turbines.

According to the present invention, however, these difficulties are overcome, and a device is provided, which is relatively simple and inexpensive to construct, which occupies a small space, and yet enables considerable gear reductions to be effected.

In one form of the invention, adapted for driving the propeller shaft in the same directions as that of the driving shaft, the latter has one or more circular races formed on its periphery. A plurality of rollers, mounted on a cage, rotatable around this shaft, engage with these races, and also with fixed outer races held against rotation in the gear housing. The parts are so proportioned that a gear reduction takes place between the speed of rotation of the turbine shaft and that of the cage. Mounted on the same spindles as those on which these rollers, hereinafter referred to as primary rollers, are mounted, there are disposed a plurality of secondary rollers, which will consequently be driven round as the cage on which they are mounted revolves. These secondary rollers make contact on the one hand with a race or races arranged around the periphery of a central idler roller, adapted to take the binding pressure of the parts, and on the other, with an outer race or races disposed in a secondary rotatable cage to which the end of the driven or propeller shaft is centrally secured. The secondary rollers and races are so proportioned and arranged with reference to the primary parts, that a further gear reduction takes place as between the primary and the secondary cages. By this means it is possible to arrange within a small space all the parts for effecting the necessary considerable gear reduction between a turbine and a propeller shaft.

It is an essential feature of the present invention, that the thrust of the propeller is used for providing the requisite binding pressure between the parts, instead of as in the previous case, springs or the like.

Where it is desired to use the device for driving at will, either in the same direction as that of the driving shaft, or in the contrary direction, reversing rollers of larger diameter than the primary forward rollers are also mounted in the primary cage, these rollers co-operating with separate inner and outer races, the outer races being mounted in the secondary cage. In this case, means are provided whereby a longitudinal movement of the secondary cage and propeller shaft, in either direction, causes either the secondary forward rollers, or the reversing rollers, to enter into driving engagement with the secondary cage, the others of said rollers remaining free. The binding pressure is again provided by means of the propeller thrust in either direction.

It will be noted that the former of the two modifications referred to, is suitable for use in cases where the driving shaft is reversible, whilst the latter is adapted to enable the use of a separate reversing turbine or the like, to be dispensed with.

It will be apparent that the gear itself may operate as a thrust block for the propeller thrust, which acts directly on the power transmitting and gear reducing members, i. e. the rollers and races.

It is the ordinary practice to utilize both a reducing gear and a thrust block in combination with marine turbines, and frictional losses occur in each of these parts, whilst the present invention, in which the same parts act in both these capacities, with very small frictional losses as between the parts, enables smooth running and greater efficiency to be achieved.

The invention further consists of various constructions and arrangements, which permit of the application of the features as above set forth.

The invention is illustrated in the accompanying drawings, in which:—

Fig. 1 shows a longitudinal section of a device for the transmission of power, with a gear reduction, from a marine turbine to a propeller shaft.

Fig. 2 is a section on the line A—B Fig. 1.

Fig. 3 illustrates a device similar to that shown in Figs. 1 and 2, but with the addition of means for reversing, and Fig. 4 illustrates a modified form of the device, shown in Fig. 3 in which the reverse may be effected without the necessity of stopping the engine.

Referring to the drawings, Figs. 1 and 2 illustrate a power transmission means, specially adapted for the transmission of power from a high velocity marine turbine or the like, to a propeller shaft. The device provides simple and efficient means, of relatively small weight, and occupying a small space, for effecting the considerable gear reduction usually necessary between the turbine and the propeller shafts.

The turbine shaft 1 enters a cylindrical housing 2, preferably made in two parts, and bolted together as at 3, through a stuffing box or the like 4. The length of the shaft 1 projecting into the housing 2, is such as to leave sufficient space for the accommodation of the secondary transmission gear to be described below.

The inner end of the shaft 1 is formed with a plurality of inwardly curved or concave portions 5, which act as primary moving races for power transmission. Within the housing 2, and around the shaft 1, there is disposed a hollow cylindrical cage 6, hereinafter referred to as the primary cage. This cage also is of greater length than that of the shaft 1 projecting within it, and it may be built up as shown, of a body portion, and end pieces, the whole being secured together by spindles 7 and nuts 8. The number of these spindles 7 will depend on the number of sets of primary rollers which it is desired to dispose within the cage 6; in the form illustrated in Figs. 1 and 2, three of such spindles are used. Mounted on each of the spindles 7, is a sleeve 9, to which are rigidly secured the primary rollers 10. The ends of the sleeves 9 are screw-threaded to receive the nuts 11, by means of which the rollers are screwed up tightly against the bosses 12, formed integral with, or otherwise secured to the sleeves 9. The primary rollers 10 have outwardly curved or convexed faces, and they are so disposed that each of them contacts with and rotates within and around one of the moving races 5. At its outer periphery, each of the rollers 10 contacts with one of the fixed races 13, which are composed of a plurality of rings, having inwardly curved or concave faces; these rings are held against rotation by the bolts 14, and they are drawn up tightly against an annular shoulder 15 in the housing 2, by means of nuts 16, or the like.

The relative diameters of the primary rollers and the fixed and moving races are so arranged as to cause a substantial reduction in gear between the shaft 1 and the sleeve 9, and a further reduction is effected by means of the secondary gear now to be described.

A plurality of sets of secondary rollers 17, of similar shape to the primary rollers 10, but of smaller diameter than the latter, are mounted one set on each of the sleeves 9, each set being rigidly secured to the other end of its sleeve, the rollers being screwed up tight against the other faces of the boss 12, by the nut or the like 18. The secondary rollers 17, being fast on the sleeves 9, rotate at the same speed as the sleeves, and they transmit the power to the driven or propeller shaft 19 by means of the rotating secondary cage 20, to which the propeller shaft is secured. The secondary cage 20, like the primary cage, is a hollow cylindrical member, and is disposed within the housing 2, and between it and the secondary end of the primary cage 6, being free to rotate within the housing and around the said cage 6. This cage 20 carries a plurality of circular rings or races 21, mounted on bolts 22, and drawn up tight thereon against the annular shoulder 23, by the nuts 24. The number of the races 21 corresponds to the number of faces on the secondary rollers 17, and they have inwardly curved or concave faces being so arranged that each roller 17 contacts with and rotates within one of the faces of the races 21. A central or idler roller or race 25, having the correct number of inwardly curved or concave faces is provided, and acts merely to take the binding pressure of the several sets of secondary rollers, so that the rollers 17 rotate between the races 25 and 21.

In order to secure the most satisfactory results, I arrange the rollers and race tracks to be so shaped that the angles which the lines representing the normals at the centres of the contact areas to the surfaces in contact under pressure make with a plane at right angles to the main axis of the gear are small, and do not in any case exceed 10°, being preferably less than this. This applies to all the forms of the invention described or illustrated therein.

The relative diameters of the primary and secondary rollers are determined by the desired reduction in gear between the shafts 1 and 19, as the speed of rotations of shaft 19 depends on the difference between these two diameters. It will be seen that the nearer the diameter of the secondary rollers 17 approaches that of the primary rollers 10, the greater will be the reduction in speed of the shaft 19.

The operation of this form of gear is as follows:—

As soon as the driving shaft 1 commences to rotate, the thrust of the propeller is transmitted through the shaft 19 to the several parts, causing the binding pressure between the rollers and races which is necessary for the transmission of power. This thrust is transmitted from the shaft 19, through the secondary cage 20 and races 21 to the secondary rollers 17, thence to the sleeve 9, and primary rollers 10, and through the stationary races 13, and the housing 2, to the hull of the ship or vessel. It will be apparent that the reduction in gear is effected in two stages, the first reduction being from the speed of the shaft 1 to that of the primary cage 6, and the second stage being that from the primary cage 6 to that of the secondary cage 20. The numbers of the primary and secondary races and of the rollers co-operating therewith respectively, may be varied according to the power to be transmitted; the greater this power is, the larger will be the number of races and rollers, and hence of contacting surfaces, which it will be advisable to use, and it will be apparent that very considerable gear reductions may efficiently be effected with a relatively small device, constructed as described.

The device illustrated in Figs. 1 and 2, is intended for marine purposes, where the propeller thrust may be used for providing the necessary binding pressure, and where it is not necessary to provide a reverse in the same device as the forward transmission. Figs. 3 and 4 illustrate modified forms of power transmission devices embodying the principles of the present invention, and in which a reverse as well as a forward transmission is provided.

Referring to Fig. 3, the driving shaft 1, which may be a turbine shaft, enters the housing 2, and has formed or mounted on its inner end a plurality of concave or like races 5. A primary cage 25, in many respects similar to the cage 6 in Fig. 2 is disposed around the end of the shaft 1, and is of sufficient length to accommodate the secondary forward and reverse gear to be described, this cage being as before, free to rotate around the shaft 1, and within the housing 2. Rotatively mounted in bearings 26, within the cage 25, and extending the length of the said cage, are a plurality of roller bearing shafts 27. The primary rollers 28, which are made with a plurality of convex or curved faces are keyed or rigidly secured to the driving end of the shafts 27, and these rollers contact with and rotate between the moving races 5 and the concave or like fixed races 29, held against rotation by bolts and nuts 30, by means of which they are also drawn up tightly against a shoulder in the housing 2. Further towards the driven end of the shafts 27, and rigidly secured thereto, are mounted the secondary forward rollers 31, and the reverse rollers 32. The rollers 31 rotate between the outer races 33 and a central idler roller 34, having suitably shaped and arranged races, whilst the rollers 32 rotate between outer races 35 and central rollers 36, the rollers 34 and 36 being provided only to take up the necessary binding pressure. The races 33 and 35 are rigidly mounted on, or form part of the secondary cage 37, which is free to rotate in either direction between the primary cage 25 and housing 2, and the driven or propeller shaft 19, is secured to the end of the cage 37.

The races 33 consist of rings having curved contact faces 53, adapted to make binding contact with the secondary rollers 31, said curved faces 53 terminating in conical faces 54, and the races 35 are also composed of rings having curved contact faces 55 and conical faces 56, the cones 56, however, being directed in the opposite direction to that of the faces 54, and the parts are so assembled and arranged that when the races 33 are in contact with the rollers 31, the races 35 are out of contact with the rollers 32, and vice versa, a longitudinal movement of the gage 37 and shaft 19 in either direction being all that is necessary to cause either of the sets of races to contact with their respective rollers, and leave the other set of rollers free.

The rollers 28 and 31 with their respective races, are of such relative dimensions as to produce the desired reduction in gear between the shafts 1 and 19, whilst the rollers 32 are of larger diameter than either of the rollers 28 and 31, thereby enabling a reverse to be obtained. Suitable means not shown, and which may be either hand or power operated, are provided for moving the parts into either the forward or reverse position, and the shaft 19 is slidably mounted in a bearing 38 within the driven end of the housing 2 to enable this movement to take place.

The operation of this form of the device is as follows:

With the parts in the position shown in Fig. 3, the device drives forward, i. e. the propeller shaft 19 rotates in the same direction, but at a lower speed than the turbine or driving shaft 1. The thrust of the propeller provides the binding pressure necessary for the power transmission, this thrust being transmitted through the cage 37, races 33, rollers 31, cage 25, rollers 28, races 29, housing 2, to the hull of the vessel. When it is desired to reverse, the engine is stopped and the cage 37 is moved longitudinally so that the races 35 engage the rollers 32, the races 33 being thereby disengaged from rollers 31. This movement is effected by any suitable means, which may be hand or power operated, not shown in the drawings, and which may of course also be used where necessary, for putting the parts into engagement for starting purposes. On re-starting the engine, the shaft 19 will rotate in the opposite direction to that of the shaft 1 the binding pressure being again provided by the propeller thrust.

In Fig. 4, I have illustrated a further modification of the invention, embodying the same principle, as that illustrated in Fig. 3, but so arranged as to provide means for reversing without it being necessary to stop the engine for this purpose.

In this modification the turbine or driving shaft 1, enters the housing 2, through the stuffing box or the like 4. The primary cage 39, secured to the inner end of the shaft 1, has a plurality of longitudinal spindles 40, on which the driving rollers are rotatively mounted. In the form illustrated, these consist of the primary rollers 41, secondary forward rollers 42, and reverse rollers 43. In the form illustrated in Fig. 4, each of the rollers has one outwardly curved face, but where the device has to be used for the transmission of heavy powers, composite rollers, each having a plurality of faces as illustrated, for example, in Figs. 1 and 3, could be employed, in which case the races would of course have to have a corresponding number of faces. The primary rollers 41 contact with the concave faced fixed race 44, held against rotation against a shoulder in the housing 2, by bolts 45. An idler roller 46, for taking the pressure is centrally disposed between and contacting with the several primary rollers. Rings 52 and 47 having inner concave faces are so disposed around the sets of rollers 42 and 43 respectively, as to contact with said rollers and to be free to rotate with them. The outer faces of these rings are coned in opposite directions, and a second idler roller 48, having a suitably shaped concave face, is centrally disposed between the rollers 42.

The secondary or driven cage 49, to which the driven or propeller shaft 19 is secured, takes the form of a double cone clutch, and has annular linings 50 and 51 of friction material, by means of which either of the rings or races 52 or 47 can be picked up at will by means of longitudinal movement of the clutch. Where the device is used for the transmission of only small powers, this movement can generally be effected by means of a hand lever or the like, but if desired other means which may be power operated, may be provided for the purpose.

In the position illustrated in Fig. 4, the shaft 19 is driven in the same direction, as, but at a less speed than that of the shaft 1, the roller 43 and the rings 47 rotating idly together. If the cage 49 be moved in the direction of the propeller which may be done without stopping the engine, the friction member 50 will be disengaged from the ring 52 which will then rotate idly with rollers 42, and on further movement in the same direction, the ring 47 will be picked up by friction member 51, and as the rollers 43 are of larger diameter than that of the primary rollers 41, the cage 49, and with it the shaft 19, will be driven in the reverse direction. As before, the propeller thrust provides the necessary binding pressure in either direction.

It should be noted that once the cage has picked up one or other of the moving races, it drives solidly therewith owing to the propeller thrust, whilst both the moving rings are always rotating whether driving or not.

In the foregoing, the rollers have been described as having convex faces, running within concave faced races, but it will be obvious that if desired, the rollers could be arranged with concave faces, engaging with inner and outer convex faced rings or races, the angularity of the surfaces of contact of course remaining as above described.

It will be seen that the invention provides a simple, efficient and compact gear device of relatively small dimensions and weight, for transmitting power from a marine turbine or like shaft, to a propeller shaft, the gear itself acting as a low friction propeller thrust block.

The parts can be made with hardened and polished steel surfaces, and the use of springs or the like, for providing the necessary binding pressure is entirely eliminated, owing to this being effected by the propeller thrust in either direction.

Three different methods of carrying out the invention have been described and illustrated, but it will be obvious that constructional and like details may be varied without departing from the spirit of the invention.

I claim:—

1. In a marine reduction gear, the combination of a driving shaft provided at its driving end with a series of circumferential grooves, a primary cage adapted to be rotated, rollers mounted on said primary cage for rotation, fixed races on which said primary rollers rotate, secondary rollers mounted on said primary cage, a secondary cage, a driven shaft secured to said secondary cage both being adapted to rotate. Secondary races on said secondary cage upon which said secondary rollers rotate.

2. In a marine reduction gear of the type described, the combination of a driving shaft, the outer end of which is provided with a plurality of circumferential grooves longitudinally curved, a primary cage, primary rollers mounted in said cage and having curved faces to cooperate with said grooves, fixed races with curved faces upon which said primary rollers rotate, secondary rollers with curved faces mounted in said primary cage, a secondary cage, secondary races with curved faces, said secondary races and said secondary cage being rigidly joined, and a driven shaft associated with said secondary cage.

3. The combination forming a reduction gear, of a driving shaft having a series of concave grooves near one end, a primary cage, a plurality of sets of rollers mounted in said cage each set of rollers being made up of a series of discs with curved surfaces adapted to rotate on said concave grooves, a plurality of races composed of rings whose inner surfaces are curved to cooperate with said curved faced primary rollers, a plurality of sets of secondary rollers with curved faces mounted in said primary cage, a secondary cage, secondary races composed of a series of rings whose inner surfaces are curved to engage with the curved faces of said secondary rollers, said secondary cage and secondary races being adapted for rotation together, and a driven shaft attached to said secondary cage.

4. In a marine reduction gear a driving shaft, a driven shaft, a primary rotatable cage, primary and secondary rollers mounted for rotation in said cage, primary races fixed to a support against rotation, a secondary cage adapted for rotation, secondary races mounted to rotate with said secondary cage, said secondary cage being adapted to rotate with said driven shaft, said support comprising part of an enclosing casing for the whole gear, said rollers and races having curved faces so shaped and arranged that the angles made by the lines representing the normal to the surfaces in contact at the centres of the contact areas with a plane at right angles to the main axis of the gear, do not exceed 10°.

5. In a marine reduction gear, a driving and a driven shaft, a rotatable primary cage, a rotatable secondary cage attached to said driven shaft, a plurality of sets of primary and secondary rollers mounted for rotation on said primary cage, a series of circular rings surrounding said primary cage forming races in which said cage rotates, said secondary cage being provided internally with a series of rings forming races in which said secondary rollers rotate, an idler roller provided with a series of grooves on its circumference and adapted to rotate between the said plurality of sets of secondary rollers, said rollers and races having curved faces, so shaped and arranged that the thrust of the propeller provides the necessary force between the said curved surfaces.

6. In a marine reduction and reversing gear the combination of a driving shaft provided with a series of curved grooves near one end, a driven shaft, primary and secondary rotatable cages, a plurality of sets of rotatable rollers mounted in said primary cage, said rollers having convexly curved peripheries, the first set of rollers proceeding from the driving shaft being the primary rollers, a primary race composed of a series of rings rigidly supported against rotation and having the inner faces curved, said primary rollers being adapted to rotate on said primary race, the curved grooves of said driving shaft rotating on and between said plurality of sets of primary rollers, the second set of curved rollers proceeding from the driving shaft being the secondary rollers, an idler roller having curved grooves adapted to rotate on and between the plurality of sets of secondary rollers, a series of secondary races composed of rings attached to said secondary cage and having curved inner faces, said secondary rollers being adapted to rotate on said secondary races, said driven shaft being fastened to said secondary cage, the third set of curved rollers proceeding from the driving shaft being the reversing rollers, an idler roller provided also with a series of curved grooves adapted to rotate on and between the reversing rollers, a series of rings mounted on the secondary cage having curved inner faces, said reversing rollers being mounted to rotate on said rings, and means for engaging either said secondary rollers or said reversing rollers with their co-operating races.

7. In a marine reduction gear a driving and a driven shaft, rotatable primary and secondary cages, primary and secondary races, said primary race being fixed against rotation, primary and secondary rollers mounted for rotation in said primary cage, said secondary races being mounted in said secondary cage, said secondary cage being adapted to rotate with said driven shaft, an idler roller in alignment with said driving shaft, said rollers and races having cooperating curved faces, and means for putting said secondary cage in driving cooperation with said secondary rollers.

8. In a marine reduction gear a driving and a driven shaft, rotatable primary and reversing secondary cages, primary and secondary races, said primary race being fixed against rotation, primary and secondary rollers mounted for rotation in said primary cage, said secondary races being mounted in said secondary cage, said secondary cage being adapted to rotate with said driven shaft, an idler roller in alignment with said driving shaft, said rollers and races having cooperating curved faces, and means for putting said secondary cage in driving co-operation with said secondary rollers.

9. In a marine reduction and reversing gear, a casing, a driving shaft having a series of curved grooves at one end, a primary cage, a secondary cage, a plurality of sets of rollers mounted for rotation in said primary cage, a series of rings attached to said casing and surrounding said primary cage at one end having curved inner faces providing a surface upon which certain of said plurality of rollers may rotate, two series of rings surrounding said primary cage at the other end having curved inner faces upon which others of said sets of rollers may rotate, said two sets of rings being attached to the secondary cage, said driven shaft being attached to said secondary cage, a plurality of idler rollers with curved grooves adapted to rotate between said sets of rollers, and means for effecting relative longitudinal movements between the two cages to provide either forward or reversing rotation.

In witness whereof, I have hereunto set my hand.

CHARLES GEORGE GARRARD.